Figure 28:
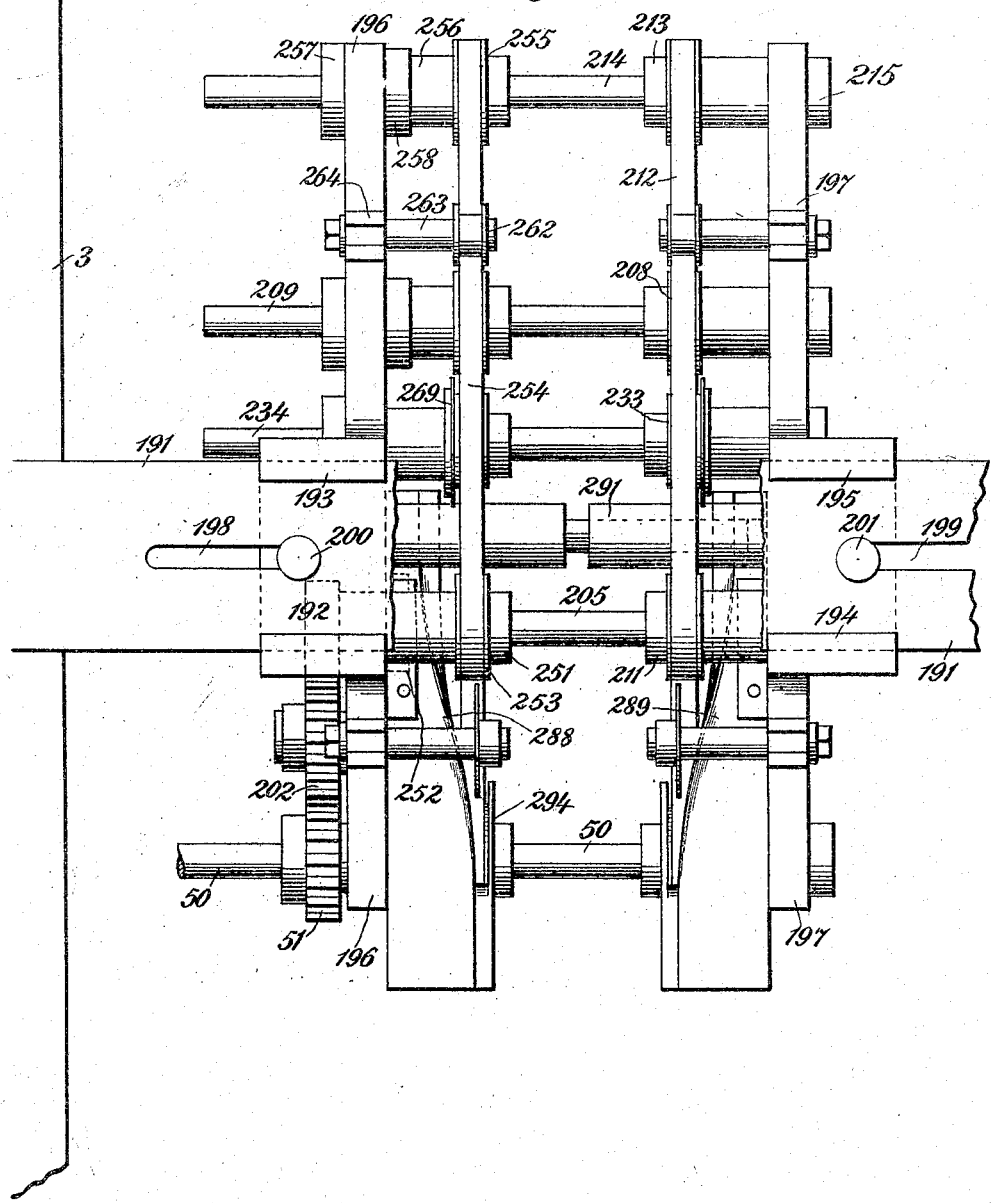

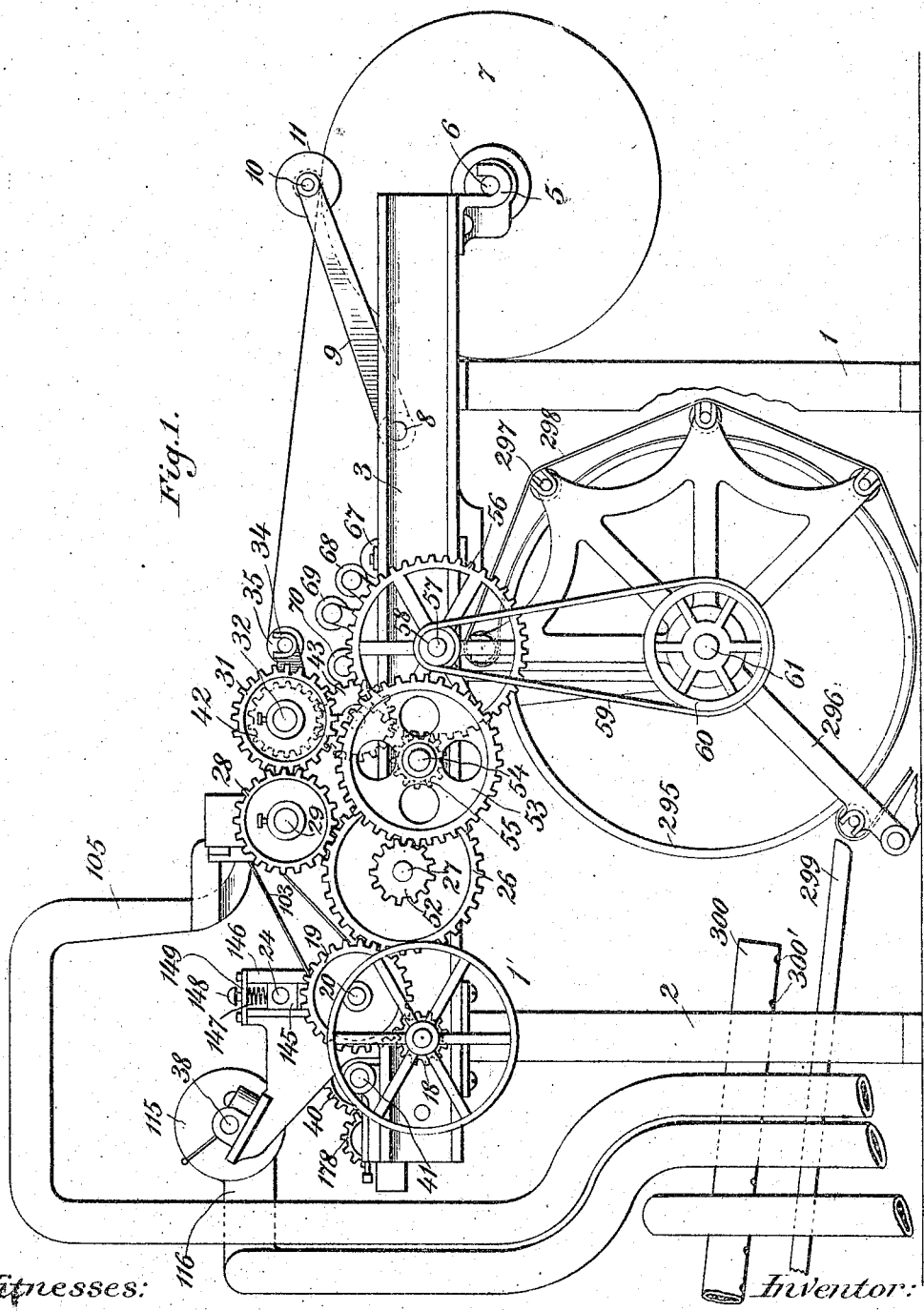

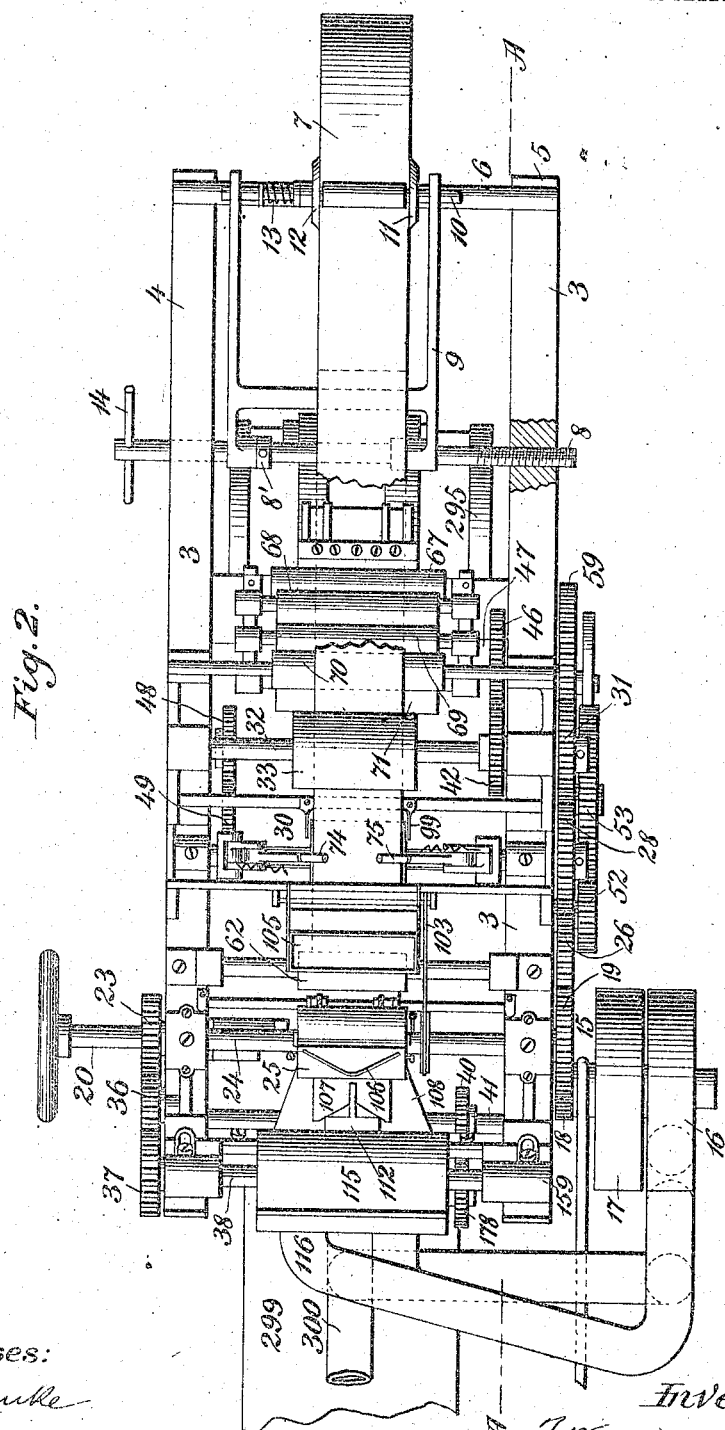

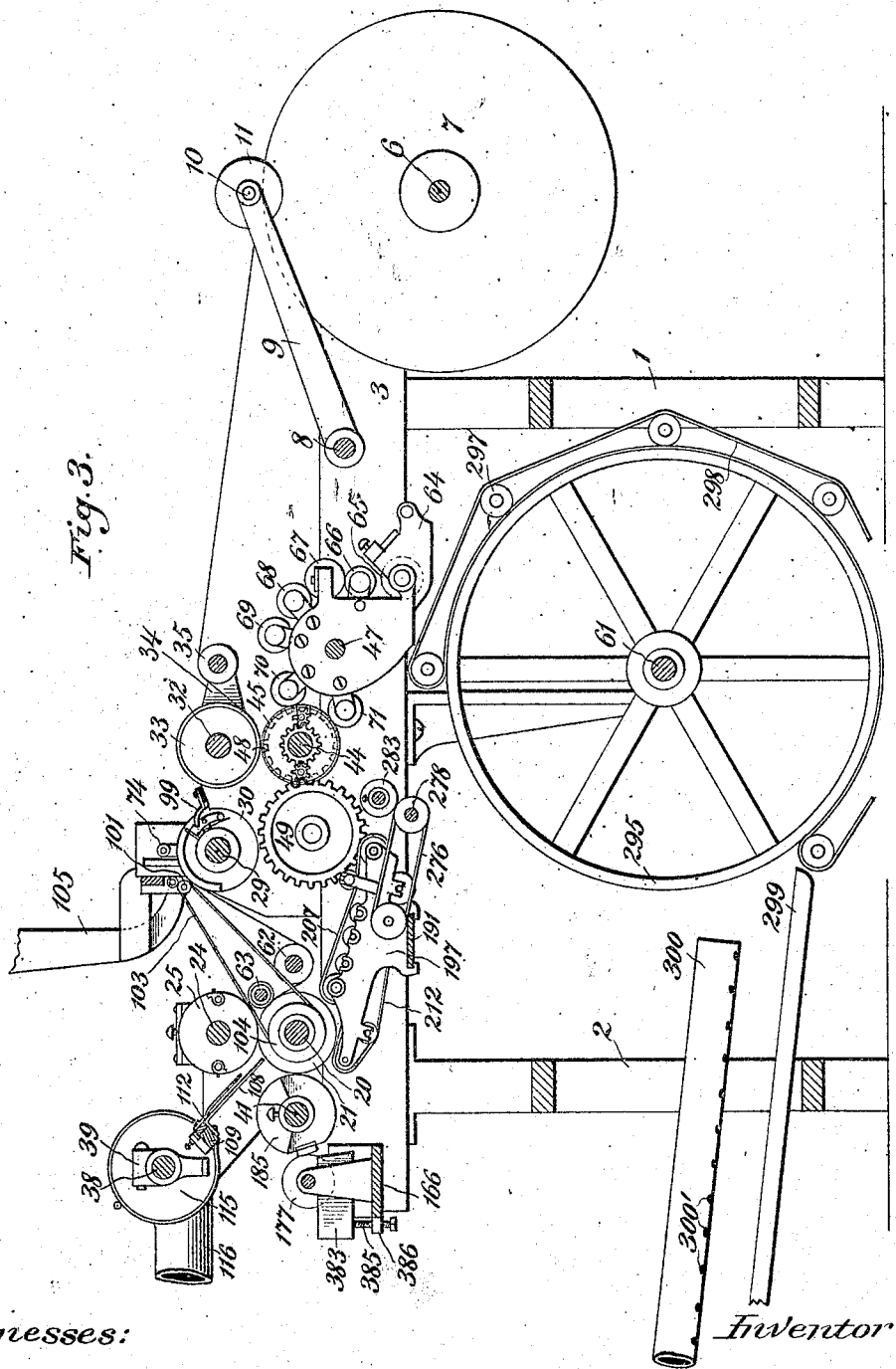

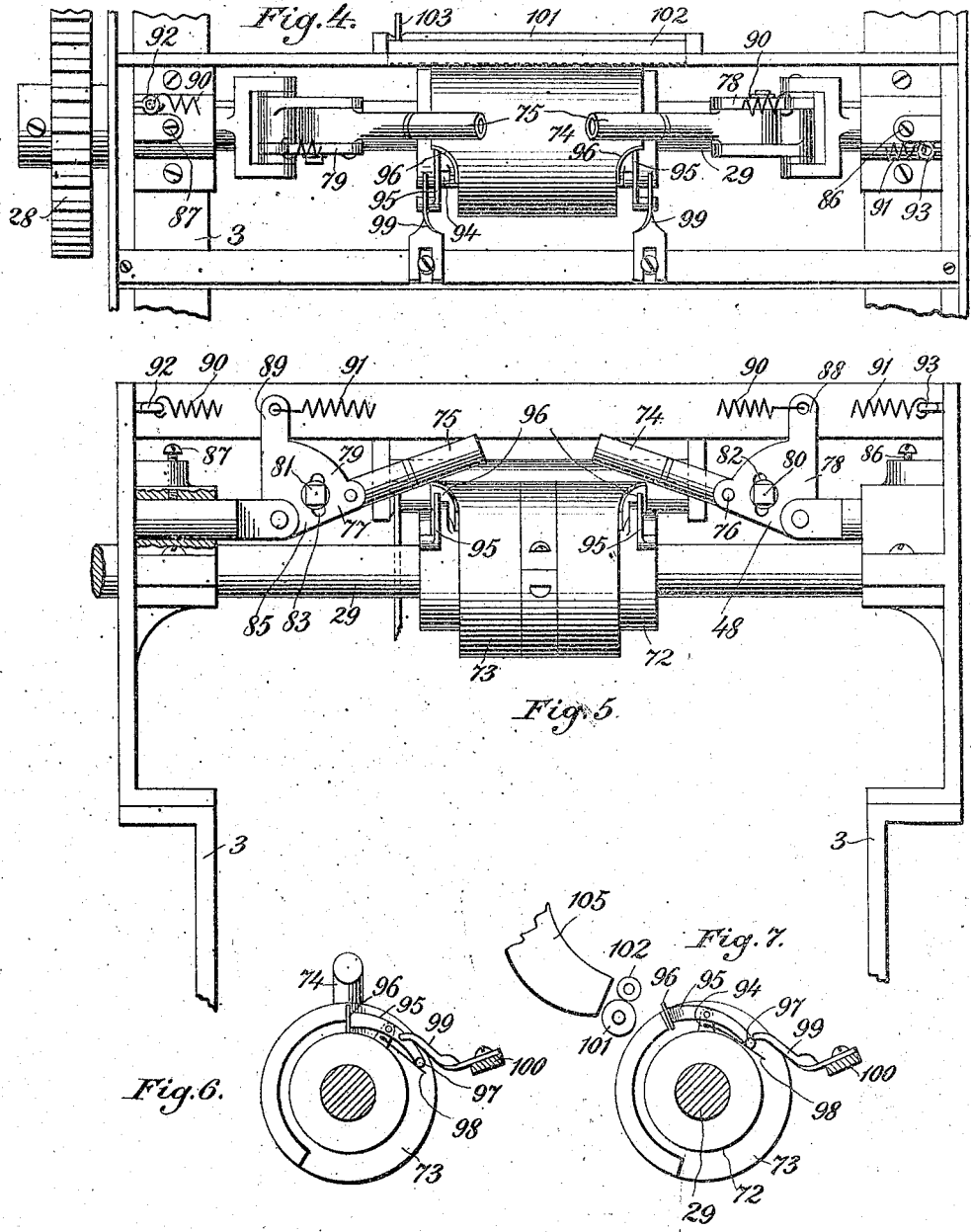

T. W. KIENAST.
ENVELOP MACHINE.
APPLICATION FILED FEB. 19, 1907.
933,374.
Patented Sept. 7, 1909.
12 SHEETS—SHEET 5.
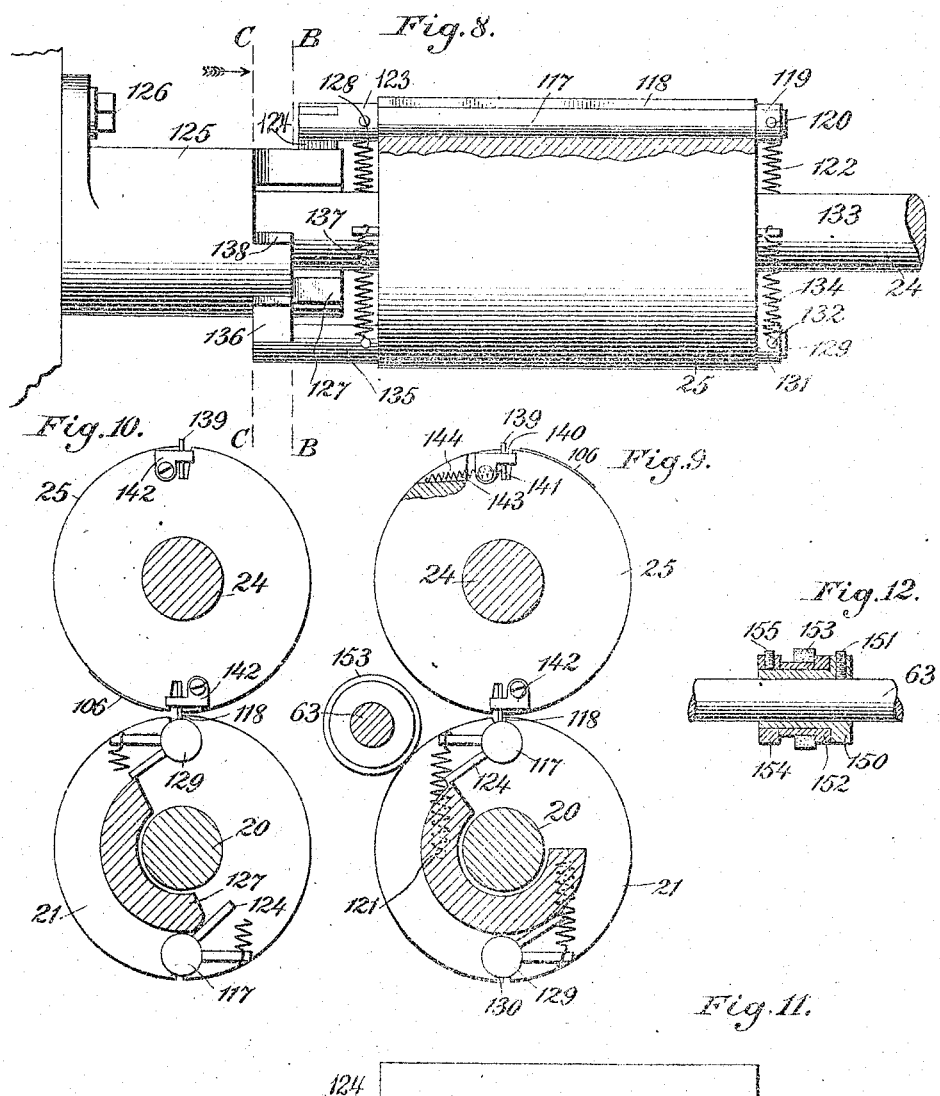
Witnesses:
H. A. Jauke
O. Knight jr.
Inventor
T. William Kienast

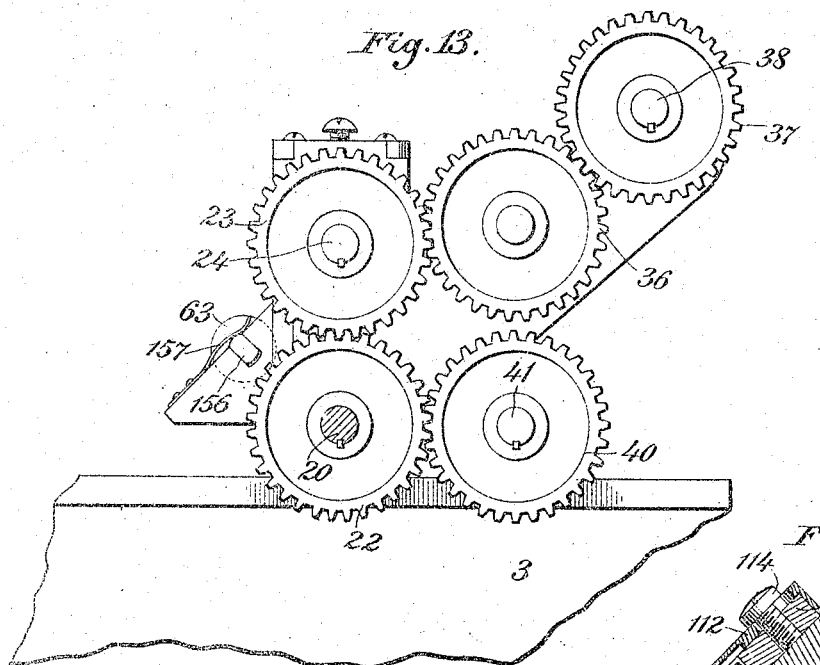
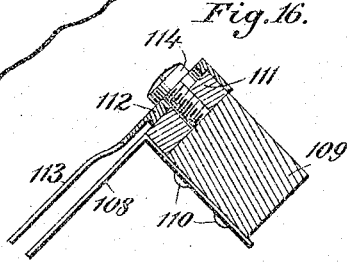
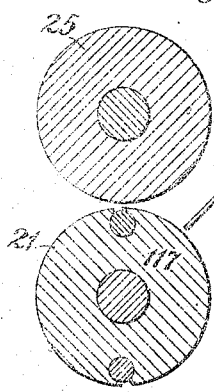
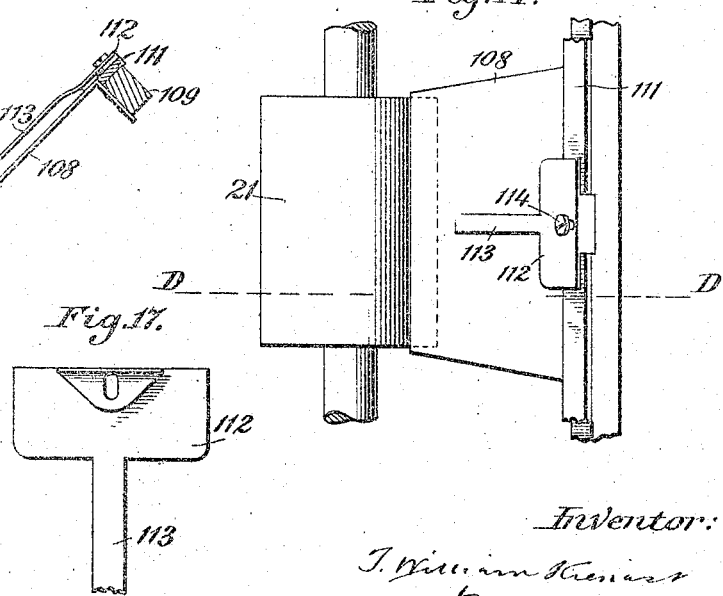

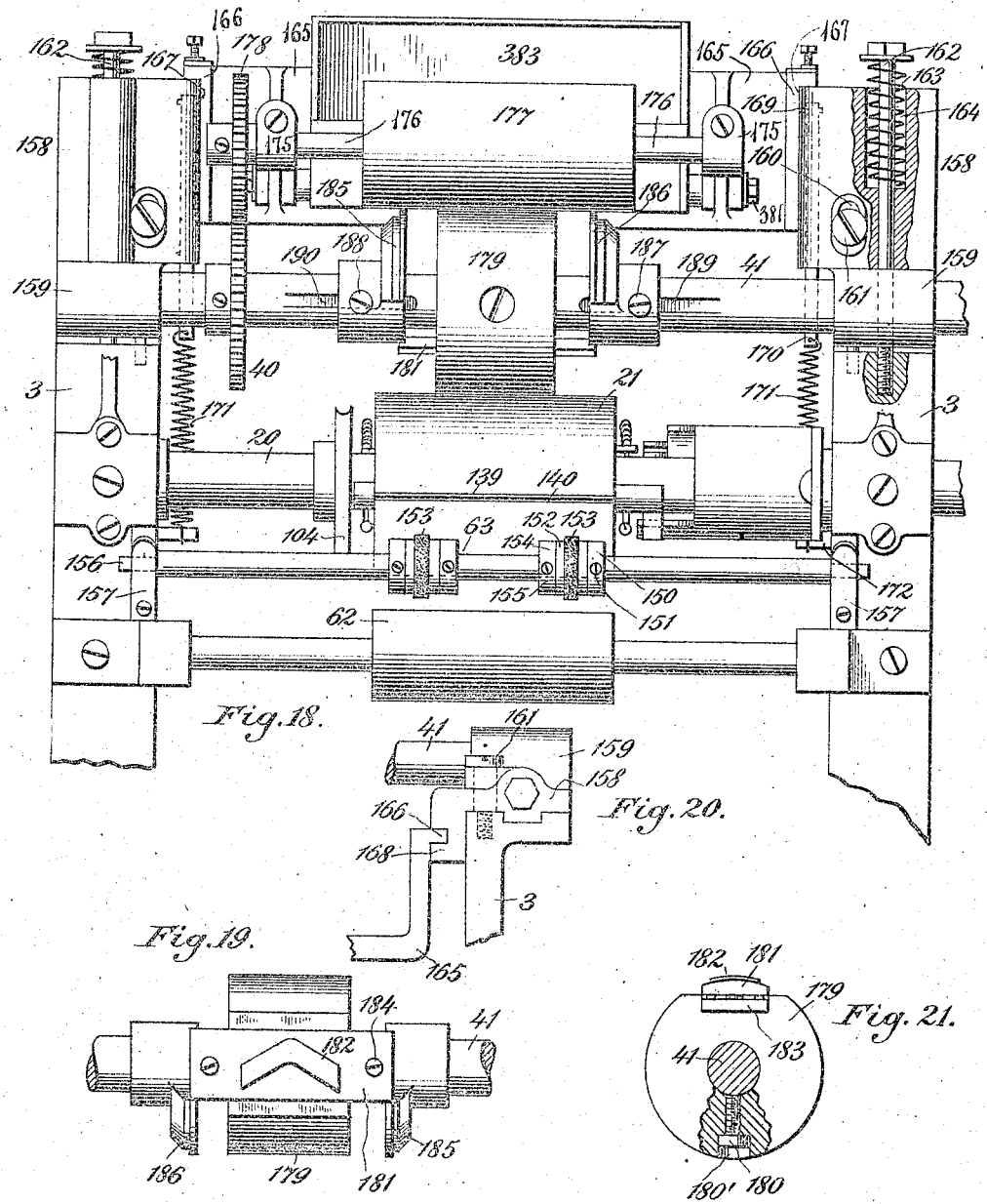

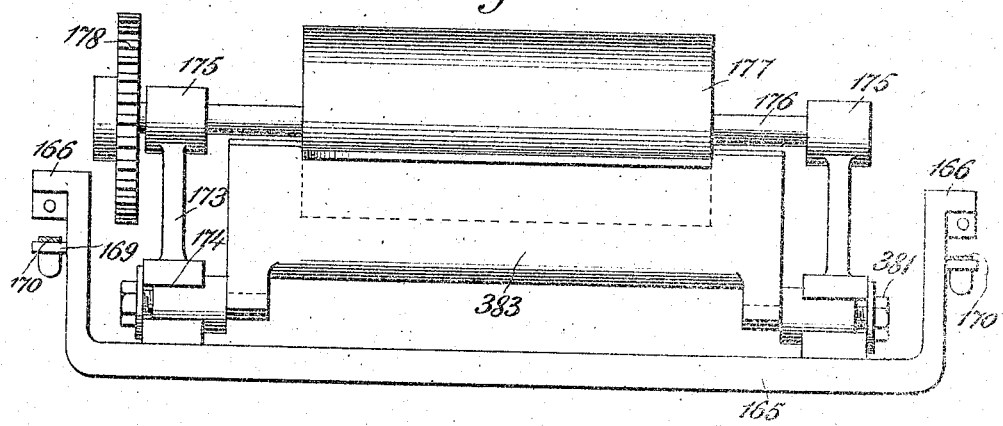
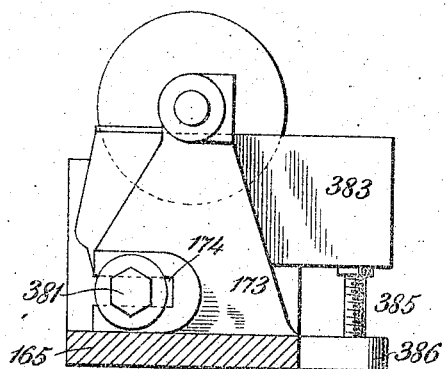
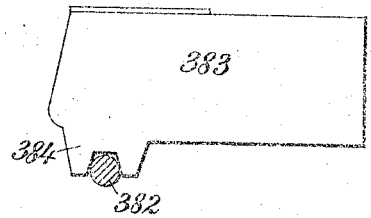
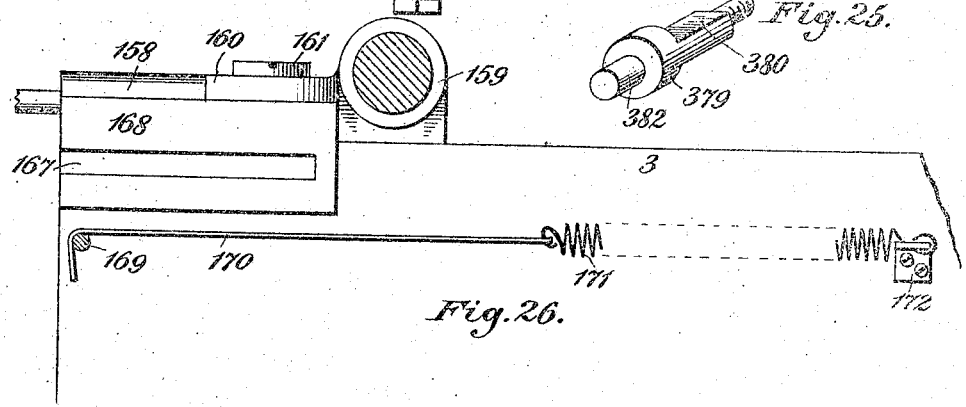

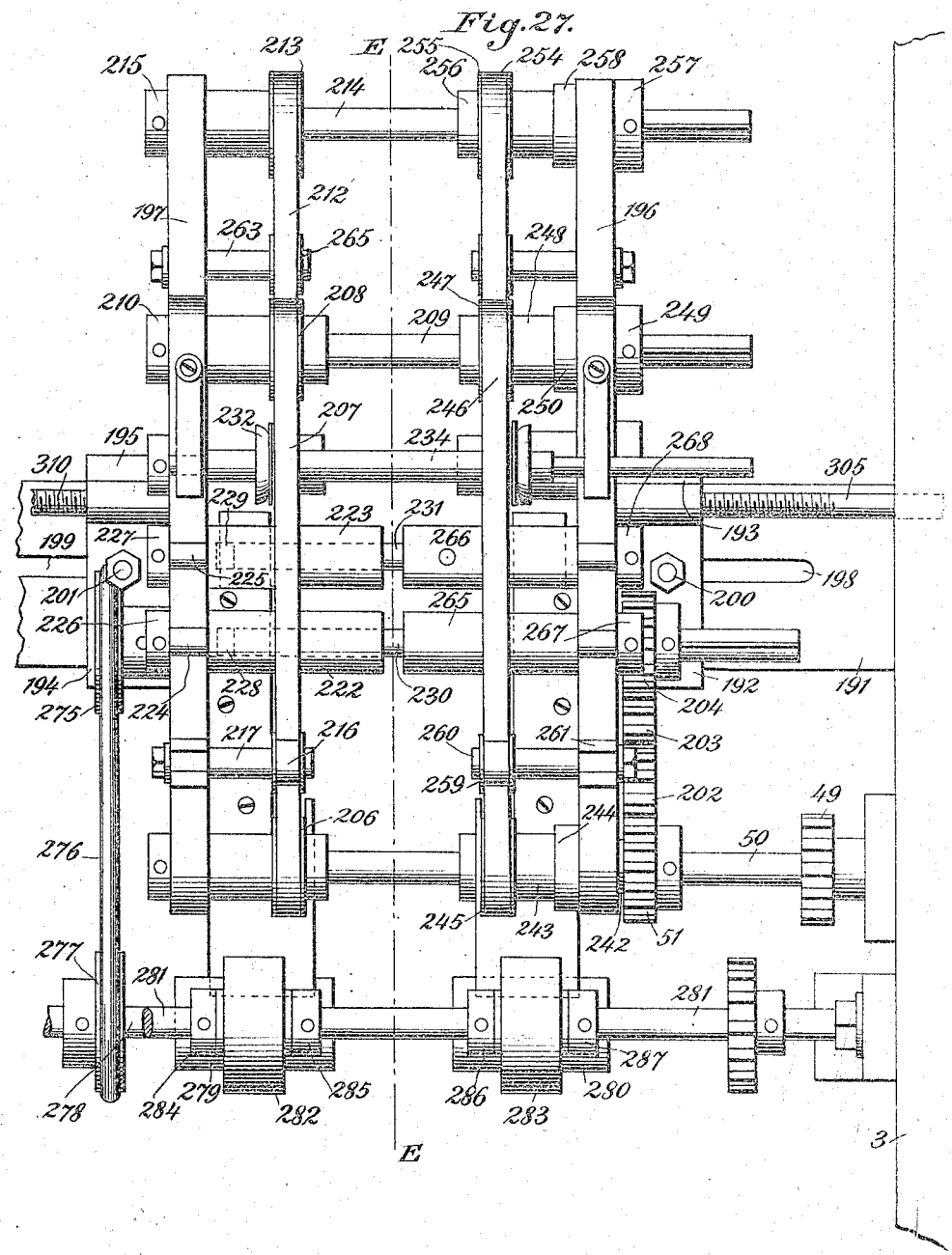

T. W. KIENAST.
ENVELOP MACHINE.
APPLICATION FILED FEB. 19, 1907.

933,374.

Patented Sept. 7, 1909.
12 SHEETS—SHEET 10.

Witnesses:

Inventor:

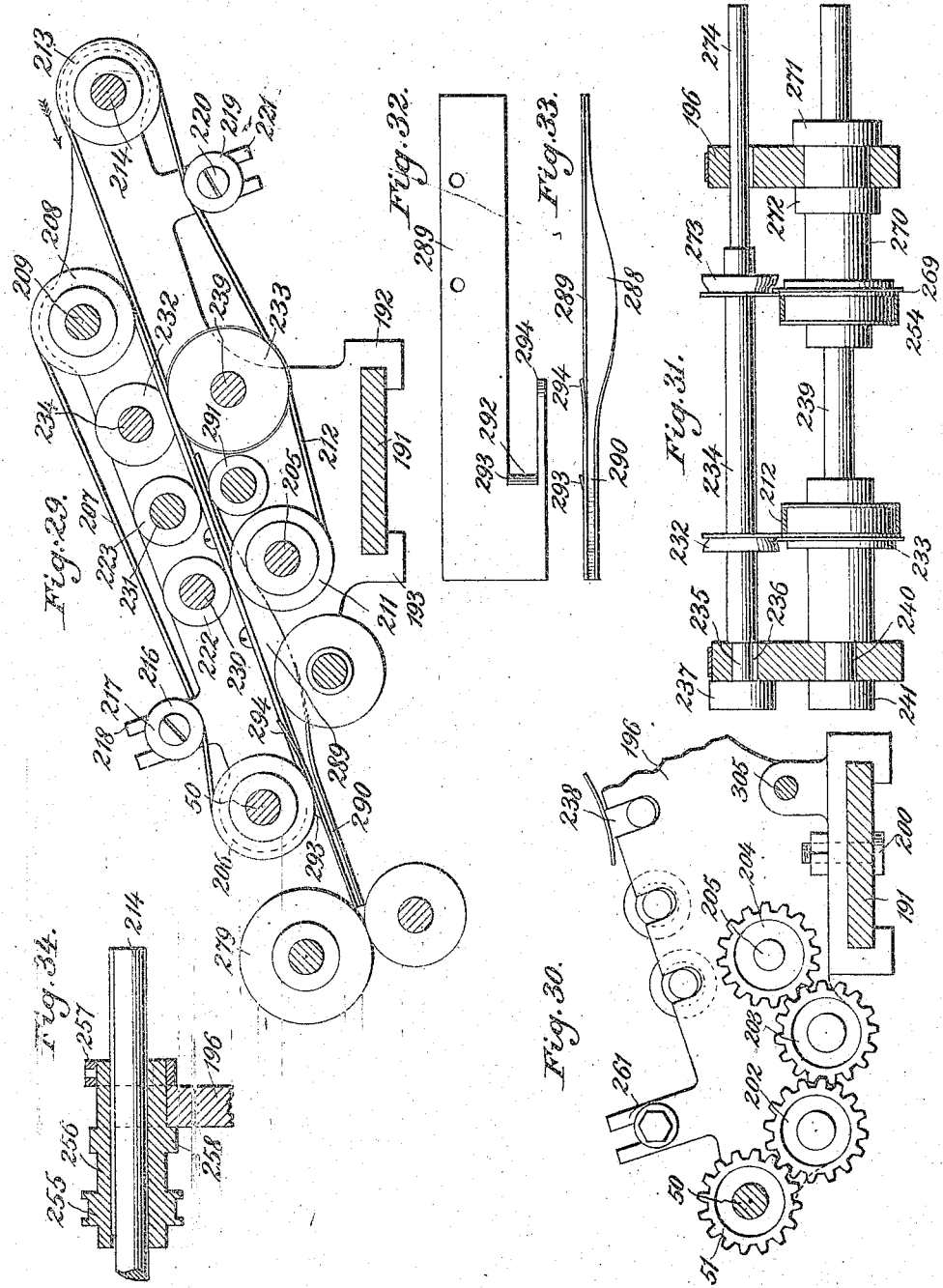

T. W. KIENAST.
ENVELOP MACHINE.
APPLICATION FILED FEB. 19, 1907.

933,374.

Patented Sept. 7, 1909.
12 SHEETS—SHEET 12.

Witnesses:
H. A. Jauke
O. Knight

Inventor.
T. William Kienast
by
Attys

UNITED STATES PATENT OFFICE.

T. WILLIAM KIENAST, OF NEW YORK, N. Y., ASSIGNOR TO SAMUEL CUPPLES ENVELOPE COMPANY, OF NEW YORK, N. Y., A CORPORATION OF MISSOURI.

ENVELOP-MACHINE.

933,374.

Specification of Letters Patent. Patented Sept. 7, 1909.

Application filed February 19, 1907. Serial No. 358,202.

*To all whom it may concern:*

Be it known that I, T. WILLIAM KIENAST, a citizen of the United States, and resident of the borough of Manhattan, in the city and State of New York, have invented a certain new and useful Envelop-Machine, of which the following is a specification.

My invention comprises certain features of novelty which will be described in the specification and more fully pointed out in the claims.

In order that my invention may be clearly understood by those skilled in the art, I have hereunto annexed sheets of drawings illustrating my improved machine, and will presently describe the invention with reference to the same.

Like reference numerals are employed to designate like parts in all the figures.

The particular features of novelty in the cutting mechanism, the envelop folding mechanism and the gumming mechanism are claimed specifically in divisional applications, but in order to show an embodiment of my invention in a complete machine, I have shown in the drawings and described in the present case an entire envelop machine.

Figure 35:
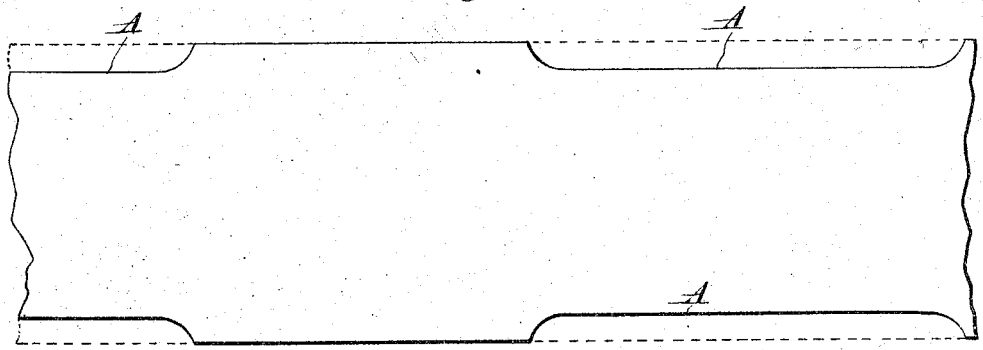
Figure 36:
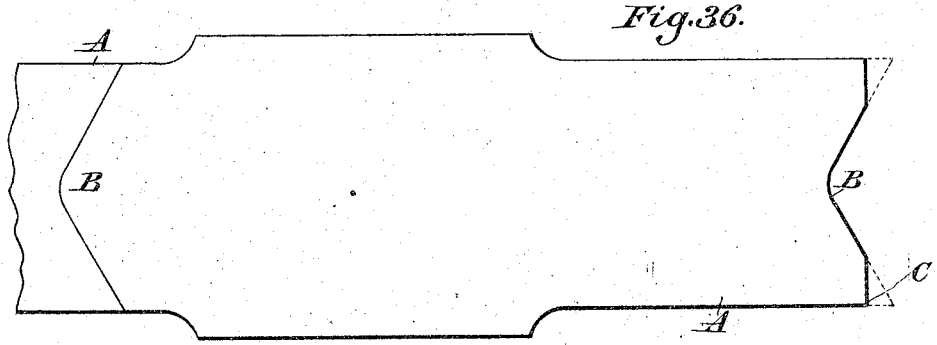
Figure 37:
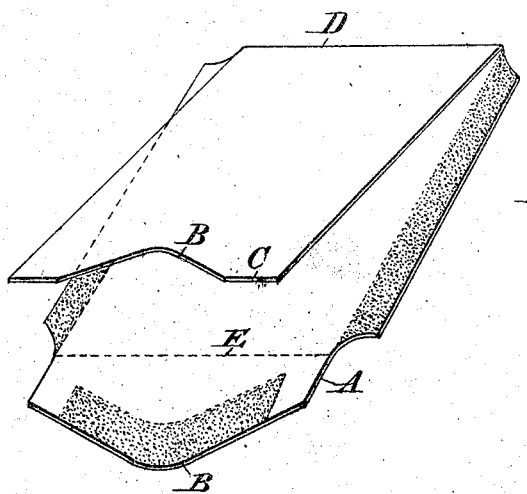

In said drawings, Figure 1 is a side elevation of the complete machine. Fig. 2 is a plan view of the same. Fig. 3 is a vertical section on the line A—A, Fig. 2. Fig. 4 is a plan view of the blank-cutting mechanism. Fig. 5 is a side elevation of the same. Fig. 6 is a detail view showing the mechanism for breaking the waste from the blank. Fig. 7 is a similar view showing the same mechanism in an advanced position. Fig. 8 is a detail view showing the cams for controlling the mechanism of the bottom roller. Fig. 9 is a section on the line B—B, Fig. 8 showing the mechanism for forming the blank, and Fig. 10 is a similar view on the line C—C of Fig. 8, showing the mechanism in advanced position. Fig. 11 is a plan view of Fig. 8. Fig. 12 is a detail sectional view of the auxiliary feed roller. Fig. 13 is a side elevation of the gearing of the rotary trimmer and paste applying roller. Fig. 14 is a plan view of the guide plate leading to the rotary trimmer. Fig. 15 is a sectional elevation of the same, on line D—D, Fig. 14. Fig. 16 is a central sectional elevation of the same. Fig. 17 is a bottom plan view of the guide finger. Fig. 18 is a plan view of the lower portion of the machine, certain parts being removed and partly disclosing the adjustable paste applying mechanism. Fig. 19 is a detail of the means for applying the paste to the flap. Fig. 20 is a view of the means for supporting and guiding the paste mechanism. Fig. 21 is a detail view of part of Fig. 19. Fig. 22 is a side elevation of the pasting mechanism. Fig. 23 is an end view of the same. Figs. 24 and 25 are detail views of the supporting trunnions of said pasting mechanism. Fig. 26 is a detail of a portion of the main frame showing a support for the supporting mechanism. Fig. 27 is a plan view of the folding mechanism. Fig. 28 is a bottom view of the same. Fig. 29 is a section on the line E—E, Fig. 27. Fig. 30 is a detail view showing the means for driving the folding rollers. Fig. 31 is a longitudinal vertical section of the scoring rollers of the folding mechanism. Figs. 32 and 33 are detail views of the lap folding plate. Fig. 34 is a detail view, in section, disclosing the means for adjusting the folding mechanism. Figs. 35, 36 and 37 are views showing the various stages of the envelop blank.

In describing the machine, I shall first trace out rather generally the various mechanisms of the machine with the connections by which they are operated from the main driving shaft, and then when I have given a general idea of the machine and the relation of each part to the other, I shall take up the individual mechanisms and describe the same in detail.

Referring now to said drawings, 1 and 2 designate the front and rear legs of the machine. Supported upon said legs are the beams 3 and 4. These beams 3 and 4 constitute the main frame of the machine, and upon them the various mechanisms are mounted.

Hung in a pair of depending hooks 5 at the forward end of the frame, is the roll axle 6 having a roll of paper 7, which is to be made into envelops. For the purpose of guiding the paper web, a rod 8 whose threaded end works in a threaded hole in the beam 3 has rotatably mounted thereon a frame 9 which is prevented from sliding on the shaft by a collar 8' and supports at its forward end a shaft 10. Said shaft 10 has mounted rigidly thereon a guiding disk 11 and a self adjustable guiding disk 12, which latter is held against the paper roll by the pressure of the spring 13. The stationary guiding disk 11 may be brought up against the side of the paper roll by turning the rod 8 by its handle 14.

The power shaft, which may receive power from any suitable source, is shown at 15. This power shaft 15 has mounted on it an idle pulley 16 and a driving pulley 17. In order to operate the machine, the power shaft 15 carries a gear wheel 18. This gear wheel 18 is in mesh with a gear wheel 19 on a shaft 20 which carries a cylinder 21 which, for convenience, I shall designate the "bottom roll." At the other end of the bottom roll shaft 20, is a gear wheel 22 which meshes with a gear wheel 23 having the same number of teeth and driving a shaft 24 which carries a cylinder 25, which, for convenience, I shall designate the "form roll." The said bottom roll and form roll, as clearly shown in Fig. 3, have their surfaces opposing each other during their rotation, the purpose of which will be described hereinafter.

The gear wheel 19 is in mesh with a large idle gear wheel 26 keyed on a shaft 27 and the gear wheel 26 in turn meshes with a gear wheel 28. The gear wheel 28 is keyed on a shaft 29. The shaft 29 carries a cylinder 30, which I shall call the "cutter cylinder" and which will be described in detail hereinafter. The gear wheel 28 meshes with a gear wheel 31 which is keyed on a shaft 32 and has the same number of teeth as the gear wheel 28. Said shaft 32 carries a roller 33 which serves the purpose of a platen in the printing operation, and hence I call it the platen.

A pair of hangers 34 (see Fig. 3) support an idle roller 35, and the paper web coming off the roll 7 passes over the idle roller 35, under the platen 33 (where the printing takes place) and over the cutter cylinder 30, as will be more fully described hereinafter.

For the purpose of operating what I designate the "rotary trimmer" the gear wheel 23 keyed on the form roll shaft, meshes with an idle gear wheel 36, (see Figs. 2, 3 and 13) which rotates a gear wheel 37 keyed to a shaft 38, which carries the rotary trimmer 39. The details of the rotary trimmer will be hereinafter described.

The paste applying mechanism receives its operating power through the gear wheel 22 which is keyed on the bottom roll shaft 20. Said gear wheel 22 meshes with a gear wheel 40 keyed to a shaft 41 which carries the mechanism for applying the paste.

My improved envelop machine is also provided with a printing mechanism, which may best be seen in Figs. 1, 2 and 3. This printer is operated in the following manner: The platen shaft 32 has keyed thereon a gear wheel 42 (Fig. 2) which meshes with a gear wheel 43 on the printing cylinder shaft 44. Said shaft 44 carries the printing cylinder 45 (see Figs. 1 and 2). Said gear wheel 43 in turn meshes with a gear wheel 46 (see Fig. 2) which is keyed on the shaft 47 (see Fig. 3) carrying the inking roller (not shown). The printer will be described in detail hereinafter.

For the purpose of operating the folding mechanism, the printer shaft 44 has keyed to it a gear wheel 48 which drives a gear wheel 49 keyed to a shaft 50, (see Figs. 2, 3 and 27). As seen in Figs. 27 and 30, the shaft 50 also has a gear wheel 51 keyed thereon, said gear wheel 51 meshing with a series of idlers and gear wheels to operate the separate parts of the folding mechanism, all of which will be clearly described in detail later on.

For the purpose of pressing down the laps and delivering the envelops, I use the well known device shown clearly in Figs. 1 and 3, which, for convenience, I designate the seam presser. This mechanism is driven in the following manner. The shaft 27 (see Fig. 1) has keyed to it a small pinion 52 which meshes with a transmission gear 53 on a stud 54 secured to the frame of the machine. Said stud 54 has keyed thereon a pinion 55 which meshes with a large transmission gear wheel 56 mounted on a stud 57 on the main frame of the machine. Said stud 57 also carries a fixed pulley 58 over which a belt 59 travels and conveys power to a pulley wheel 60 fixed on the seam presser shaft 61.

Having now described my improved envelop machine in general, and having shown the relation of the various mechanisms to each other, I shall next describe the mechanisms in detail.

The first operation to which the paper is subjected is the printing. The printing mechanism may be of any well known type. I have shown in Fig. 3 a very simple form. An ink-fountain 64 supplied with ink has a feed roller 65 rotating therein and a roller 66 operated by a cam (not shown) is intermittently moved into engagement with said roller 65. The said oscillating roller 66 transfers the ink to a roller 67 which is always in engagement with the main inking roller 48. The distributing rollers 68 and 69 distribute the ink evenly over the main roller 48 and the rollers 70 and 71 transfer the ink from roller 48 to the printer cylinder 45. The printing is done by the printer cylinder 45 acting against the paper as it passes under the platen 33. The next operation is the lap cutting. The mechanism for this is shown in Figs. 3, 4, 5, 6 and 7. As already stated the shaft 29 carries a cutting cylinder 30. This cylinder, as clearly shown in Figs. 4 and 5 is not regular, but has a body portion 72 and a cutter portion 73. Said cutter portion 73 has edges adapted to cut the paper along the line A of Fig. 35 when pressed against them, and to effect this pressure, I provide the mechanism with a pair of pressure rollers 74 and 75. Said pressure rollers 74 and 75 are pivoted by pivot pins 76 and 77 in sockets 78 and 79, and the bolts 80 and 81 passing through the ends of said pressure rollers lie in slots 82 and 83 so that the rollers may be moved to the desired angle in the sockets and then secured in place by tightening their bolts 80 and 81. Said sockets are themselves pivoted to studs 84 and 85 which are secured to the frame by screws 86 and 87. For the purpose of holding the pressure rollers against the cutting edges of the cylinder 30, the sockets 78 and 79 have formed integral therewith the upwardly extending lugs 88 and 89. These lugs are provided with perforations or other analogous devices for attaching the ends of the springs 90 and 91. The other ends of the springs 90 and 91 are attached respectively to hooks 92 and 93, said hooks being secured to the frame. It is thus obvious that the pressure of the rollers 74 and 75 upon the cutting edge of the cylinder 30 may be increased or diminished by adjusting the position of said rollers 74 and 75 in their sockets 78 and 79 without unfastening the springs. This is a very efficient and readily operated means of adjustment. Another feature of novelty in this cutting mechanism is a device for breaking away the waste which has been cut off. It is found in practice that the cut made by the mechanism just described is not "clean" at the end and the waste has a tendency to hold on to the web. To obviate this difficulty, I provide each side of the body portion 72 of the cylinder 30 with a stud 94 and pivot thereon a rocking lever 95 as clearly shown in Figs. 6 and 7. Said rocking lever 95 has at one end a flange or bent portion 96 and at the other a lug 97. Said lug 97 has engaging it a leaf spring 98 which is so mounted in the cylinder 30 that the flange end 96 of the rocking lever 95 is held normally down. When it is desired to break away the waste strip the lever is rocked against the tension of the spring 98. This is done by supporting in the path of said lugs 97 a tripping finger 99, which may best be mounted upon a bar 100 extending across the machine at the proper place.

In Fig. 6, I have shown the rocking lever 95 before it is tripped, and in Fig. 7 I have shown the same as it is being tripped. As seen in Figs. 3 and 7, the rocking lever 95 is tripped just at the proper moment to guide the end of the waste strip between a pair of rollers 101 and 102. Just before the cylinder 30 reaches the position in its rotation when the lever 95 would strike the roller 101, the tripping finger 99 disengages the lug 97 and allows the lever to be rocked by the spring so as to avoid the roller 101. The said roller 101 is rotated by a belt 103 driven by a pulley 104 on the bottom roll shaft 20. The roller 102 being in contact with the roller 101 will rotate with the same and the waste strip will thus be gripped by the pair and carried into a suction shaft 105 of any well known construction. After the paper web has left the lap cutting mechanism, it passes down under the idle roller 62, up between the bottom roll 21 and the idler 63, and between the bottom roll 21 and the form roll 25. This portion of the machine is best illustrated in Figs. 2, 3, 8 to 12, and 18.

It will be seen by referring to Fig. 2 of the drawings, that the form roll 25 is provided with a V-shaped slitting knife 106 whose function is to cut the flap of the envelop on line B of Fig. 36. This cut extends entirely across the paper web, thus severing the web into units, each unit of which goes to make one envelop. In said Fig. 2 it will also be observed that the end 107 of the paper web which has been cut in the form of a V, passes up the guide plate 108 on its way to the rotary trimmers 39. Said guide plate 108 is screwed to the beam 109 by the screws 110. The stationary knife blade 111 is secured on the top of the beam 109. A stop plate 112 provided with an elongate finger 113, and having its body portion slotted to receive a set screw 114 is superposed on said stationary knife blade and the set screw 114 is fastened therein so as to hold the stop plate 112 in proper position. The position of said stop plate may obviously be varied by this means. The finger 113, as seen clearly in Fig. 16 is bent in such a way as to permit the paper to slide beneath it on the guide plate 108 until it has gotten into position to have its ends trimmed off on line C of Fig. 36 by a pair of knives on the rotary trimmer 39. By arresting the free end of the strip in this manner, the part to be trimmed remains stationary during the trimming regardless of the continued rotation of the gripper cylinder which feeds it. This trimming operation is carried on in a chamber 115 from which the air is exhausted by means of an exhaust pipe 116 in the well known manner, so that the waste is carried away. But just before the knives of the rotary trimmer have cut off the ends of said strip of paper, the bottom roll 21 has gripped the paper unit in the place which is to be the end of the envelop opposite to the flap, and starts to fold the paper on itself and carry it downward toward the paste roller. This gripping mechanism will next be described.

Referring to Figs. 8 to 11 inclusive, it will be seen that the bottom roll 21 has two gripping mechanisms which for convenience I shall term the "first" and "second" respectively, the "first" gripping mechanism being the one which makes the fold near the middle of the unit on line D, Fig. 37, and the second being that which subsequently grips the unit near the flap on line E, Fig. 37. In Fig. 9 the "first" gripping mechanism is at the top of the bottom roll 21 and is represented as being just about to grip the paper. The bottom roll 21 as shown in the drawing is provided with a longitudinal perforation which is circular in cross section and a longitudinal slot communicates therewith from the surface of the roll. A rod 117 provided with a single elongated gripping blade 118 fits in the recess thus formed, the gripping blade 118 occupying the slot but capable of oscillating therein as the rod 117 rocks in its bed. Said rod 117 has keyed to one of its ends just outside the cylinder, a collar 119 which is provided with a spring attachment lug 120. A spring attaching lug 121 (not shown in Fig. 8) is provided on the bottom roll and between these two lugs a spring 122 is strung the tension of which tends to rock the rod 117 and thus cause the gripping blade 118 to oscillate and grip the paper which has been pushed between it and the wall of the slot by the scoring member of the form roll hereinafter described. But to adjust the intervals at which the gripper is thus rocked by its spring 122, a cam mechanism is provided which allows the gripper to operate only when it has released it. This cam mechanism will now be described. Mounted on the other end of said rod 117 is a collar 123 which carries a lever 124. Mounted in the path in which this lever travels during the rotation of the bottom roll is a stationary cam cylinder 125. As shown in Fig. 8, this cam cylinder 125 surrounds one end of the bottom roll shaft 20, and is bolted to the side frame of the machine by bolts 126. The lever 124 is operated by running into the cam surface 127 on said cam cylinder, and rises against the tension of the gripper spring, until it is traveling over the regular surface of the cam cylinder 125. A spring 128 may be attached to the collar 123 and the bottom roll in a similar manner to that already described, and strengthen the tendency of the gripper rod 117 to rock and grip the paper. The "second" gripper, comprises a rod 129, a gripping blade 130, a collar 131 at one end of said rod 129, spring attaching lugs 132 and 133 and a spring 134; a collar 135 at the other end of said rod 129, a lever 136 thereon, and a suitably attached spring 137 for adding to the tension under which the "gripper" operates. All these parts are in every way similar to those already described in connection with the "first" gripper. There is, however, this difference between the operation of the two grippers. The "second" gripper must take hold of the paper before the first gripper lets go, in order to insure that the scoring will be made at exactly the proper place. The distance between the first and second scores, it will be understood, determines the length of the envelop made, so these two scores must always be the same distance apart. The second gripper subsequently serves to hold the blank tight on the bottom roll while the paste is being applied. To accomplish this purpose, the cam 127 is less than 180° thus allowing the gripper 118 which is held open by it to remain closed during more than one-half of the revolution of the bottom roll (see Fig. 10).

The scoring mechanism of the form roll, which, as mentioned above, serves the purpose of pushing a bight of the paper into the grippers, is illustrated in Figs. 9 and 10. Said scoring mechanism comprises a scoring bar 139 which is set in a slot 140 in the form roll, said scoring bar projecting a little way beyond the periphery of the form roll. The scoring bar 139 has also reduced ends 141 which extend beyond the ends of the roll and over which detaining lugs 142 are placed to prevent the scoring bar from falling out, but loose enough to permit the same to move laterally in the slots. These detaining lugs 142 may be screwed to the end of the roll as shown in Figs. 9 and 10. A spring 143 fitting in a recess 144 in each end of the form roll is suitably attached to each end of the scoring bar and having its other end secured to the wall of the recess 144 serves to normally hold the scoring bar against the forward wall of the slot 140.

The form roll shaft 24 is mounted in self-adjustable journals as shown in Fig. 1. The journal blocks 145 may move up or down in their tracks or ways 146, against the tension of the springs 147 which may be adjusted by bolts 148 passing through cross bars 149 at the top of said ways. This allows of self adjustment for different thicknesses of paper which may pass between the bottom roll and the form roll. The rotation of the form roll and the bottom roll is so regulated by their gears that the scoring bar will descend into the gripper slot right against the side of the gripper blade, and at that moment the cam lets go of the lever and allows the gripper springs to rock the gripper against the tension of the scoring bar springs until the scoring bar has been withdrawn from the gripper slot and it then grips the bight of paper which was forced into it by the scoring bar and carries it down in its rotation. I have described one of the scoring bars, for the reason that they are both alike in every detail, it being obvious that one scoring bar would be provided for each of the grippers.

Referring now to Figs. 3, 12, 13 and 18, I have shown here an auxiliary roller 63. This roller serves the purpose of holding the web of paper against the bottom roll. In order to make this roller adjustable to different widths of paper I mount upon the non-rotatable shaft of the roller 63 a pair of bands 150, each of which may be keyed to the shaft at any desired point by means of a set screw 151. Each of the bands 150 is flanged or shouldered at the end through which the set screw passes and against this shoulder I place a collar 152. The collar 152 is not keyed to the band 150 but is free to rotate thereon. This collar 152 has also a shoulder and against this I place a ring 153 of some substance, such as leather, or its equivalent. A ring 154 is then slipped on the end of the band 150 and being keyed thereto by its set screw 155, serves to confine the rotating collar 147. The shaft on which this roller is mounted, has each of its ends flattened to fit into a slot 156 (see Figs. 13 and 18) and a leaf spring 157 removably secures the shaft in its mounting.

The pasting mechanism comprises two general parts, the paste trough, and the paste applying roller. The paste applying roller mechanism is resiliently mounted in the main frame of the machine, as shown in Figs. 18, 20 and 26. In this mechanism, 158 designates the journal bearing plate which fits on the machine frame and is provided with the journal bearing 159 in which the paste distributer shaft 41 is journaled. This journal bearing plate 158 is not secured rigidly to said frame but is provided with a slot 160 through which a machine screw 161 passes loosely, said screw 161 being threaded into the machine frame and provided with a shoulder to prevent its being screwed into the frame so far as to bind the journal plate. It is thus apparent that the paste applying roller may move to the extent of the slot 160 toward or away from the bottom roll. To make this adjustment automatic, a bolt 162 is passed through a recess in the journal bearing plate 158 and threaded into the main frame. The head of this bolt projects beyond the recess, and has bearing against it a spring 163 which is positioned in an enlarged recess 164 and confined between said bolt head and the bottom of the recess. The tendency of said spring 163 is to hold the paste applying roller against the bottom roll, but as increased thicknesses of paper come through, the entire paste applying mechanism moves back, including the trough, which as will appear presently is supported indirectly by the journal bearing plate 158. The paste trough and distributing roller are mounted upon a U-shaped bracket 165. The upwardly extending arms of said bracket 165 are provided with outturned ends or flanges 166 which are slidably positioned in slots 167 of a downwardly extending bend 168 of the plate 158. This bracket 166 is provided at each arm with a spring attachment lug 169 to which a plate 170 is hooked, said plate 170 having attached to its other end a spring 171 the other end of which is attached to the lug 172 on the machine frame (see Figs. 22 and 26). The tendency of this spring is to keep the distributer roller against the applying roller, but the engagement is obviously yielding.

Referring to Figs. 22 to 25, it will be seen that the U-shaped bracket 165 has a pair of upright supports 173 which have slots 174 near the bottom and are provided with journal bearings 175 at the top. The journal bearings 175 support a shaft 176 which carries the paste distributing roller 177. Said shaft 176 likewise carries a gear wheel 178 which meshes with the gear wheel 40 (see Fig. 18). Each of the slots 174 receives a stationary trunnion 379 (shown in detail in Fig. 25), which has a cut away portion 380 to allow it to enter the slot, and a nut 381 threaded on the end thereof secures it in place. A circular end 382 protrudes inwardly, and upon this rests one end of the paste trough 383. The paste trough 383 does not rest directly upon the stationary trunnion, but is provided with lugs 384 which, as seen in Fig. 24, have angular recesses which fit over the round portion 382 of the stationary trunnions. This arrangement prevents binding. The other end of said paste trough 383 is supported by a set bolt 385 (see Fig. 23), which passes through a threaded perforation in a lip 386 of the U-shaped bracket and may be turned to tilt the paste trough 383 to the desired angle. It will be observed that the paste trough should be tilted until the front wall almost bears upon the surface of the paste distributing roller 177 to prevent an abnormal amount of paste from remaining on the roller.

The paste applying roller is carried by the shaft 41. This mechanism is shown in detail in Figs. 18, 19 and 21. In said mechanism 179 is a central roller which is keyed to the shaft 41 by the set screw 180 in a recess 180'. This central roller 179 has one side flattened to receive the paste die plate 181 which applies the paste to the flap of the envelop by means of its die 182. This die plate 181 is secured to a plate 183 on the central roller by means of the screws 184 and springs are interposed between the plates 181 and 183 to give a yielding motion to the die plate as it engages the paste distributing roller 177. This die plate is made removable so that other die plates of different sizes may be substituted, and the position of the central roller 179 being adjustable on the shaft 41, complete adjustability is thus insured. The lap pasting members are in the form of segment rollers 185 and 186 which are keyed to the shaft 41 on either side of the central roller by set screws 187 and 188 which pass into the slots 189 and 190 in said shaft 41. It is evident from this construction that the position of the segments may be varied for different widths of paper. The paste is applied to both laps and the flap at one place by my improved mechanism, as the envelop blank is carried downward by the bottom roll in its rotation. As the first gripper of the bottom roll gets a little beyond the lower point, its cam operates it to free the paper from its grip, and the rear end of the envelop blank which is all cut and provided with paste, is passed down to the folding mechanism which will be described next.

The folding mechanism is shown in Figs. 3 and 27 to 34 inclusive. Referring now to these figures, it will be seen that a plate 191 extends across the machine at the underneath side of the machine frame, and to this are secured the jaws 192, 193, 194 and 195 of the side frames 196 and 197 of the folding mechanism. The plate 191 is provided with slots 198 and 199 through which pass bolts 200 and 201 for laterally adjusting the position of the folding mechanism on the plate. This frame serves as the support for two belt movements, which, for convenience of description, I shall designate as the "upper belt" and the "lower belt" movements. The envelop is carried between the upper and lower belts. Each belt movement carries a pair of belts.

Referring now to Figs. 29 and 30, it will be seen that the shaft 50, carries a gear wheel 51, which, as stated before and shown in Fig. 27, is driven by the gear wheel 49. The gear wheel 51 drives an idler 202 which is in mesh with a second idler 203, said idler 203 driving the gear wheel 204 keyed on the shaft 205. The shaft 50 drives the upper belts, and the shaft 205 drives the lower belts. The shaft 50 carries a belt pulley 206 over which the upper belt 207 travels, the other end of said belt 207 being carried by the pulley 208 which may be either integral with or keyed to a shaft 209. The shaft 209 is journaled at this end in the side frame 197, and a retaining collar 210 is keyed on the reduced end of the shaft outside of the frame. As stated above, the shaft 205 drives the lower belt. This is done by a belt pulley 211 on said shaft 205, the belt 212 passing around said pulley and having its other end supported by the pulley 213 either integral with or keyed to a shaft 214. The reduced end of said shaft 214 is journaled in the side frame 197 and keyed thereon is a retaining ring 215. For the purpose of adjusting the tension of the belt 207, an idle roller 216 bearing on said belt is mounted on a shaft 217 which may be bolted in proper position in the slotted arm 218 of the side frame 197. A similar device is provided for adjusting the tension of the lower belt 212, which comprises a roller 219 mounted on a shaft 220 which is bolted in proper position in a slotted arm 221 of the side frame 197. The upper belt serves as the pressure belt, while the lower belt serves as the carrying belt. To assist in the function of the upper belt, I provide the pressure rollers 222 and 223, which have reduced ends 224 and 225 integral therewith and resting in slots in the side frame 197, and have keyed thereon the retaining rings 226 and 227. These rollers 222 and 223 are also provided with central longitudinal cavities or recesses 228 and 229 into which slide the shafts 230 and 231. I also provide a scoring mechanism in the folding mechanism. For this purpose I provide a pair of scoring rollers 232 and 233. (See Fig. 31.) The upper roller 232 is integral with a shaft 234, the reduced end 235 of which is journaled in slot 236 of the side frame 197 and has a retaining ring 237 keyed to its end. A spring pressure bearing 238 tends to keep the upper scoring roller against the lower scoring roller (see Fig. 30). The lower scoring roller 233 is integral with a shaft 239 which has its reduced end 240, journaled in the side frame and provided with a retaining ring 241 keyed thereto. The scoring roller 233 assists in carrying the belt 212.

I have described one side of the folding mechanism throughout before describing the other side, for the reason that the two sides are not mounted in the same way. In the side which I have first described, the rollers are all either integral with or keyed to their shafts, whereas those on the other side are nearly all mounted on or integral with sleeves which are splined to the shafts already described, said sleeves being so mounted in the side frame 196 as to be enabled to slide away from the rollers already described, and thus provide for adjusting the folding mechanism to different widths of envelops. This sliding apart of the folding mechanism is accomplished by turning the rods 305, 310 which are threaded into the two side frames 196 and 197 as shown in Fig. 27. The other ends of these rods are threaded in the main frame of the machine and are provided with turning handles (not shown).

Referring now to Fig. 27, it will be remembered that the shaft 50 was said to carry a gear wheel 51. This gear wheel 51 is not keyed directly to the shaft 50 but is keyed to the reduced end portion 242 of a sleeve 243 which is splined to said shaft 50. Said sleeve 243 has a shoulder 244 abutting against the side frame 196 in which the reduced end 242 is journaled, and the sleeve also carries a belt pulley 245. The belt pulley 245 drives the upper belt 246, and the other end of said belt travels over an idle pulley 247 which is integral with a sleeve 248 splined on the shaft 209 and journaled in the side frame 196, a retaining ring 249 being keyed on the end of the sleeve. The sleeve 248 has also a shoulder 250 abutting against the side frame 196. The gear wheel 204 is keyed to the end of a sleeve 251, (Fig. 28) splined on the shaft 205 and journaled in the side frame 196. Said sleeve 251 has a shoulder 252 abutting against the side frame 196. The sleeve 251 has also a belt pulley 253 integral therewith and carrying a lower belt 254. The lower belt 254 is supported at its other end by an idle belt pulley 255 which is integral with a sleeve 256 splined to the shaft 214 and journaled in the side frame 196, a retaining sleeve 257 being keyed to the end of said sleeve 256. The sleeve 256 has also a shoulder 258 abutting against the side frame 196. The tensions of the upper belt 246 and the lower belt 254 are adjusted in the same manner as the belts 207 and 212. The tension of the upper belt 246 being adjusted by a pulley 259 mounted to rotate on a shaft 260, said shaft 260 being bolted in a lott 1 arm 261 of the side frame 196. (See Fig. 27). The tension of the lower belt 254 is adjusted by means of a roller 262 (Fig. 28) which is mounted to rotate on a shaft 263 bolted in a slotted arm 264 of the main frame 196. The upper belt 246 is borne upon by a pair of pressure rollers 265 and 266 which are keyed to the above mentioned shafts 230 and 231, the ends of said shafts resting in slots in the side frame 196 and provided with the retaining rings 267 and 268. The scoring mechanism at this side of the frame comprises a lower scoring roller 269 integral with a sleeve 270 splined on the above-mentioned shaft 239 and journaled in a slot in the side frame 196. The sleeve 270 has at its end a retaining ring 271 and is also provided with a shoulder 272 abutting against the side frame 196. The roller 269 assists in carrying the lower belt 254.

The upper scoring roller 273 is rotatably mounted upon a shaft 234, and its position thereon is controlled by the scoring flange of the bottom scoring roller 269 which will be clearly seen in Fig. 31, travels in the recessed portion of said roller 273. The reduced end 274 of the shaft 234 is journaled in a slot in the side frame 196 and its position in said slot is determined by a spring pressure bearing similar to the bearing 238 already described, so that the upper scoring roller 273 is held in suitable engagement with the lower scoring roller 269. The mounting of these various rollers and sleeves in the side frame 196 is shown in detail in Fig. 34. In this figure I have shown the mounting of the sleeve 256 which carries the lower belt pulley 255. The retaining ring is shown at 257 and the shoulder on the sleeve 256 at 258. It will thus be seen that as the sleeve 256 is splined to the shaft 214 the side frame 196 may be moved laterally to change the position of the sleeve on the shaft 214 without disturbing its rotation.

Referring now to Fig. 27 it will be seen that the shaft 205 has keyed to its end a pulley 275 which drives a belt 276, the other end of said belt being carried by a pulley 277 keyed to a shaft 278 which is journaled in the main frame of the machine and which carries a pair of pressure rolls 279 and 280 which are keyed thereto at any desired position on the shaft. Immediately above the shaft 278 is a stationary shaft 281 on which are mounted the idlers 282 and 283. These idlers bear upon the rollers 279 and 280 and are held in place by the sleeves 284, 285, 286 and 287. The position of these idlers on stationary shaft 281 is adjusted by hand. The envelop blank as it leaves the bottom roll 21 is delivered on the two lower belts immediately above the pulleys 213 and 255. These lower belts 212 and 254 carry the blank in between the upper belts and the lower belts, until the laps of the blank strike the curved surface 288 of the folding plate 289, which is shown in detail in Fig. 33. As the blanks progresses, the lap is turned over by the flange of this curved surface 288 until it is finally folded over on the back of the envelop, which occurs in the slotted portion 290 of said folding plate 289. As the envelop passes into this folding plate it is given additional support by a roller 291 (Fig. 29). The upper portion of the folding plate 289 is cut away at 292 to allow the upper belt 207 to pass through the ends 293 and 294 being given a slight upward tilt to insure the safe passage of the envelop into the portion 290. As the envelop emerges from the end of the portion 290 of the folding plate it is delivered to the pressing rollers carried by the shafts 278 and 281, already mentioned, and by these rollers the laps are tightly pressed down.

From the pressure rollers the envelop passes on to the seam presser mounted upon the shaft 61 and shown in Figs. 1 and 3 of the drawings. This mechanism comprises a wheel 295 which is mounted in a frame 296, said frame having radial arms at the ends of which are mounted a number of idle pulleys 297 carrying endless belt 298. This belt 298 is driven by its frictional contact with the circumference of the seam presser wheel 295, and as the envelops pass from the pressing rollers mentioned above they are received by the seam presser and carried down between the belt and the circumferences of the wheel, which further presses their laps and finally delivers them to the delivery board 299. The pressure of the envelops coming off the seam presser wheel forces those before them up this inclined delivery board 299 past the drier 300 which is supplied with hot air in any well known manner, and has perforations 300' which expel the same over the envelop for the purpose of drying the paste. As the envelops arrive at the top of the delivery board 299 they may be gathered and placed in boxes by the attendant.

In the manufacture of envelops by my machine, the paper web leaves the roll 7, (see Figs. 1, 2 and 3) passes over the idler 35, under the platen 33, where it is printed by the printer cylinder 45; then up over the cutter cylinder 30 where the paper is cut on line A, Fig. 15; then down under an idler 62 and up under the auxiliary roller 63 between the bottom roll 21 and the form roll 25 which cuts the flap on line B, Fig. 35, and makes the first fold; then up the rotary trimmer 39 where the ends are trimmed on line C, Fig. 36; then down between the bottom roll 21 and the paste mechanism; and thence to the folder, where the laps are folded over. From this mechanism the envelop is passed to the seam presser where the pressing is completed and the envelop is then passed out to the delivery board at the rear of the machine.

I have used the word "paste" in this specification to indicate any kind of adhesive material. In practice it is usually preferable to use gum.

Having thus described my invention, the following is what I claim as new therein and desire to secure by Letters Patent:

1. In an envelop machine, the combination with means for cutting a V-shaped slit in the paper; of a trimmer adapted to trim off the ends of said V-shaped slit, a guide receiving the paper from said cutting means and directing it to said trimmer, and means in the path of the paper to the trimmer engaging the end of the paper and arresting it in proper position to be cut by said trimmer.

2. In an envelop machine, the combination with means for cutting a V-shaped slit in the paper; of a trimmer adapted to trim off the ends of said V-shaped slit, a guide receiving the paper from said cutting means and directing it to said trimmer, and means in the path of the paper to the trimmer engaging in the apex of the V-shaped slit of the paper and arresting it in proper position to be cut by said trimmer.

3. In an envelop machine, the combination with means for cutting a V-shaped slit in the paper; of a rotary trimmer adapted to trim off the ends of said V-shaped slit, a guide receiving the paper from said cutting means and directing it to said trimmer, and means in the path of the paper to the rotary trimmer engaging the end of the paper and arresting it in proper position to be cut by said trimmer.

4. In an envelop machine, the combination with means for cutting a V-shaped slit in the paper; of a rotary trimmer adapted to trim off the ends of said V-shaped slit, a guide receiving the paper from said cutting means and directing it to said rotary trimmer, and means in the path of the paper to the trimmer engaging in the apex of the V-shaped slit of the paper and arresting it in proper position to be cut by said trimmer.

5. In an envelop machine, the combination with means for cutting a V-shaped slit in the paper; of a rotary trimmer adapted to cut off the ends of said V-shaped slit, a guide receiving the paper from said cutting means and directing it to said trimmer, and means in the path of the paper to the trimmer engaging over the end of the paper and arresting it and holding it down on the guide in proper position to be cut by said trimmer.

6. In an envelop machine, the combination with means for cutting a V-shaped slit in the paper; of a trimmer adapted to trim off the ends of said V-shaped slit, a guide receiving the paper from said cutting means and directing it to said trimmer, and means in the path of the paper to the trimmer engaging in the apex of the V-shaped slit of the paper and arresting it and holding it down on the guide in proper position to be cut by said trimmer.

7. In an envelop machine, the combination with means for cutting a V-shaped slit in the paper; of a rotary trimmer adapted to trim off the ends of said V-shaped slit, a guide receiving the paper from said cutting means and directing it to said trimmer, and means in the path of the paper to the rotary trimmer engaging over the ends of the paper and arresting it and holding it down on the guide in proper position to be cut by said trimmer.

8. In an envelop machine, the combination with means for cutting a V-shaped slit in the paper; of a rotary trimmer adapted to trim off the ends of said V-shaped slit, a guide receiving the paper from said cutting means and directing it to said rotary trimmer, and means in the path of the paper to the trimmer engaging in the apex of the V-shaped slit of the paper and arresting it and holding it down on the guide in proper position to be cut by said trimmer.

9. In an envelop machine, the combination with means for cutting a V-shaped slit in the paper; of a trimmer adapted to trim off the ends of said V-shaped slit, a guide receiving the paper from said cutting means and directing it to said trimmer, an arresting device in the path of the paper to the trimmer engaging the end of the paper and arresting it in proper position to be cut by said trimmer, and means for adjusting the position of said arresting device.

10. In an envelop machine, the combination with means for cutting a V-shaped slit in the paper; of a trimmer adapted to trim off the ends of said V-shaped slit, a guide receiving the paper from said cutting means and directing it to said trimmer, an arresting device in the path of the paper to the trimmer engaging in the apex of the V-shaped slit of the paper and arresting it in proper position to be cut by said trimmer, and means for adjusting the position of said arresting device.

11. In an envelop machine, the combination with means for cutting a V-shaped slit in the paper; of a rotary trimmer adapted to trim off the ends of said V-shaped slit, a guide receiving the paper from said cutting means and directing it to said trimmer, an arresting device in the path of the paper to the rotary trimmer engaging the ends of the paper and arresting it in proper position to be cut by said rotary trimmer, and means for adjusting the position of said arresting device.

12. In an envelop machine, the combination with means for cutting a V-shaped slit in the paper; of a rotary trimmer, a guide receiving the paper from said cutting means and directing it to said rotary trimmer, an arresting device in the path of the paper to the trimmer engaging in the apex of the V-shaped slit of the paper and arresting it in proper position to be cut by said rotary trimmer, and means for adjusting the position of said arresting device.

13. In an envelop machine, the combination with means for cutting a V-shaped slit in the paper; of a trimmer adapted to trim off the ends of said V-shaped slit, a guide receiving the paper from said cutting means and directing it to said trimmer, an arresting device in the path of the paper to the trimmer engaging over the end of the paper and arresting it and holding it down on the guide in proper position to be cut by said trimmer, and means for adjusting the position of said arresting device.

14. In an envelop machine, the combination with means for cutting a V-shaped slit in the paper; of a trimmer adapted to trim off the ends of said V-shaped slit, a guide receiving the paper from said cutting means and directing it to said trimmer, an arresting device in the path of the paper to the trimmer engaging in the apex of the V-shaped slit of the paper and arresting it and holding it down on the guide in proper position to be cut by said trimmer, and means for adjusting the position of said arresting device.

15. In an envelop machine, the combination with means for cutting a V-shaped slit in the paper; of a rotary trimmer adapted to trim off the ends of said V-shaped slit, a guide receiving the paper from said cutting means and directing it to said rotary trimmer, an arresting device in the path of the paper to the rotary trimmer engaging over the end of the paper and arresting it and holding it down on the guide in proper position to be cut by said trimmer, and means for adjusting the position of said arresting device.

16. In an envelop machine, the combination with means for cutting a V-shaped slit in the paper; of a rotary trimmer adapted to trim off the end of said V-shaped slit, a guide receiving the paper from said cutting means and directing it to said rotary trimmer, an arresting device in the path of the paper to the trimmer engaging in the apex of the V-shaped slit of the paper and arresting it and holding it down on the guide in proper position to be cut by said trimmer, and means for adjusting the position of said arresting device.

17. In an envelop machine, the combination with a rotary trimmer; of a guide plate upon which the paper to be cut passes on its way to said rotary trimmer, and means on said guide plate for arresting the travel of said paper when it reaches the proper position for being cut by said rotary trimmer.

18. In an envelop machine, the combination with a rotary trimmer and a guide plate upon which the paper to be cut travels on its way to said rotary trimmer; of a limiting plate mounted over said guide plate in position to arrest the travel of the paper when it reaches proper position to be cut by said rotary trimmer.

19. In an envelop machine, the combination of a rotary trimmer; of a pair of rollers between which the paper travels, a guide plate which receives the paper emerging from said rollers and directs it to said rotary trimmer, and means positioned above said guide plate for stopping said paper in position to be cut by said rotary trimmer.

20. In an envelop machine, the combination with a rotating shaft, a cutter rotated by said shaft and a stationary cutter coöperating with said rotating cutter to cut the paper; of a guide plate for directing the paper to be cut to said stationary cutter, and means positioned above said guide plate for stopping said paper in proper position to be cut by the rotating cutter.

21. In an envelop machine, the combination with a rotary trimmer; of a guide plate directing the paper to said rotary trimmer, a limiting plate for stopping the paper in proper position to be cut by said rotary trimmer, and means for adjusting the position of said limiting plate.

22. In an envelop machine, the combination with a rotary trimmer; of a pair of rollers through which the paper travels, a guide plate receiving the paper from said rollers and directing it to said rotary trimmer, a limiting plate for holding the paper in proper position to be cut by said rotary trimmer, and means for adjusting the position of said limiting plate.

23. In an envelop machine, the combination with a rotary trimmer, a guide plate directing the paper to be cut to said trimmer, and a limiting plate for stopping the paper in proper position to be cut by said rotary trimmer; of a pair of rollers through which the paper passes and by which the paper is moved along said guide plate to said rotary trimmer, and a gripping means in one of said rollers for gripping the paper and removing it from said guide plate after it has been cut by said rotary trimmer.

24. In an envelop machine, the combination with a pair of rollers coöperating to cut a V-shaped slit in the paper of a rotary trimmer to trim off the ends of said V-shaped slit, a guide plate receiving the paper from said rollers and directing it to said rotary trimmer, and means mounted on said guide plate for stopping the paper in proper position to be cut by said rotary trimmer.

25. In an envelop machine, the combination with a pair of rollers coöperating to cut a V-shaped slit in the paper; of a rotary trimmer for trimming off the ends of said V-shaped slit, a guide plate receiving the paper from said rollers and directing the same to said rotary trimmer, means for stopping the paper in proper position to be cut by said rotary trimmer, and means for adjusting the stopping means.

26. The combination with means for trimming off the end of a strip, and means for feeding the strip to and withdrawing it from said trimming means; of means independent of said feeding means for arresting the end to be trimmed and holding it stationary during trimming.

27. The combination of a rotary member suitably recessed, a scoring bar disposed in the recess of said rotary member with shouldered ends projecting beyond the ends of the rotary member, and retaining means secured on the ends of the rotary member adapted to retain the scoring bar therein.

28. In an envelop machine, the combination with a roller provided with a gripping mechanism, of a roller provided with a slot, a scoring bar loosely positioned in said slot and having shouldered ends projecting beyond the ends of said roller, and detaining lugs engaging the shouldered ends of said scoring bar to hold it in said slot.

29. In an envelop machine, the combination with a roller provided with a gripping mechanism; of a roller provided with a slot, a scoring bar loosely positioned in said slot and having shouldered ends projecting beyond the ends of said roller, a spring normally holding said scoring bar in one side of said slot, and detaining lugs engaging the shouldered ends of the bar to hold it in said slot.

30. In an envelop machine, the combination with a roller provided with gripping mechanism; of a slotted roller, a scoring bar in the slot thereof with shouldered ends and adapted to coöperate with the gripping mechanism of the other roller, detaining lugs engaging over the shouldered ends of said scoring bar to hold it in place, and a blank severing cutter on said slotted roller.

31. In an envelop machine, the combination with a roller provided with gripping mechanism and adapted to grip and carry the envelop blank; of a slotted roller, a scoring bar in the slot thereof with shouldered ends and adapted to coöperate with said gripping mechanism, detaining lugs engaging over the shouldered ends of said scoring bar, and means for operating said gripping mechanism.

T. WILLIAM KIENAST.

Witnesses:
 HARRY E. KNIGHT,
 WM. P. HAMMOND.